May 10, 1932.  A. C. GOUGH  1,857,953
MULTIPLE SPINDLE BORING MACHINE
Filed June 27, 1928  4 Sheets-Sheet 1
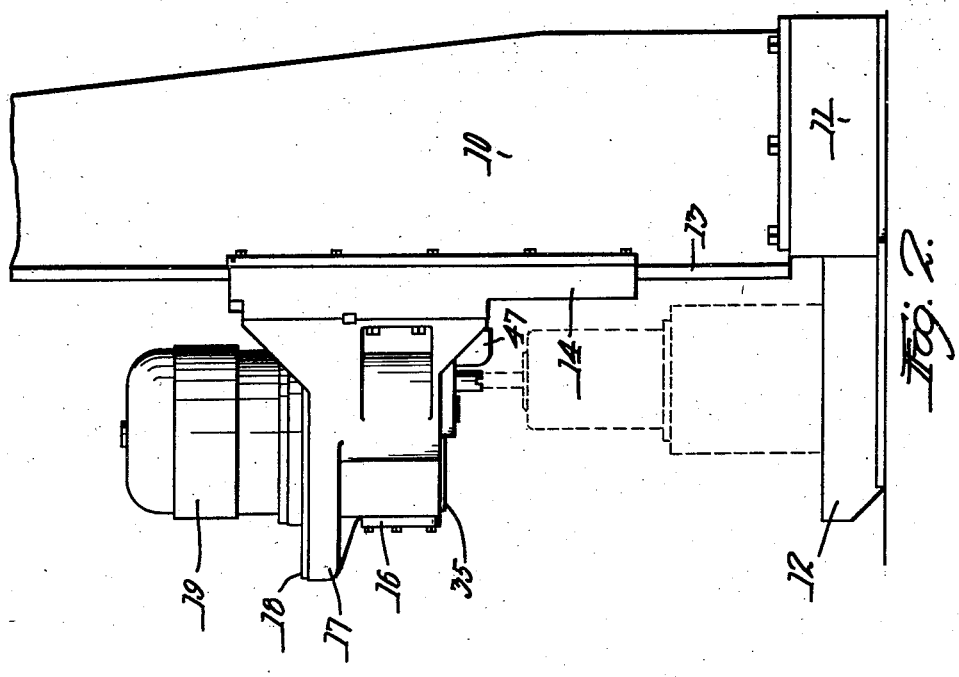
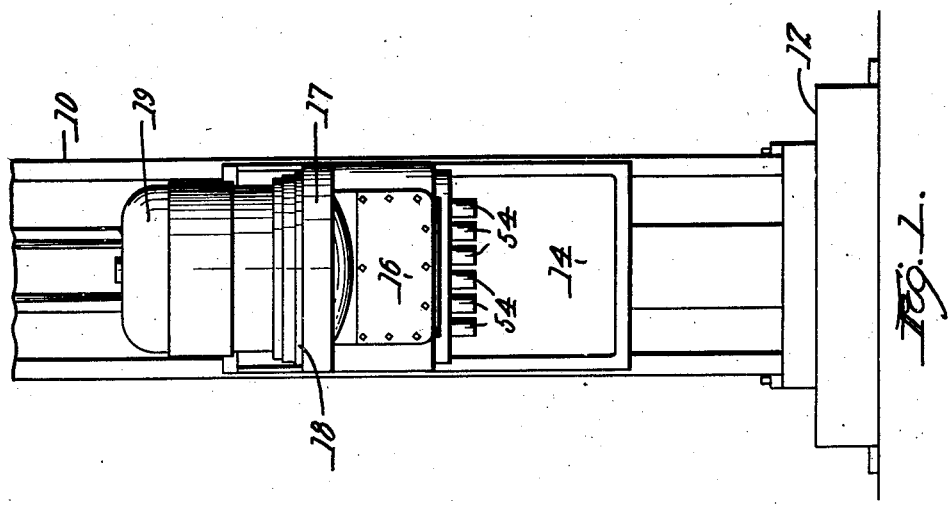

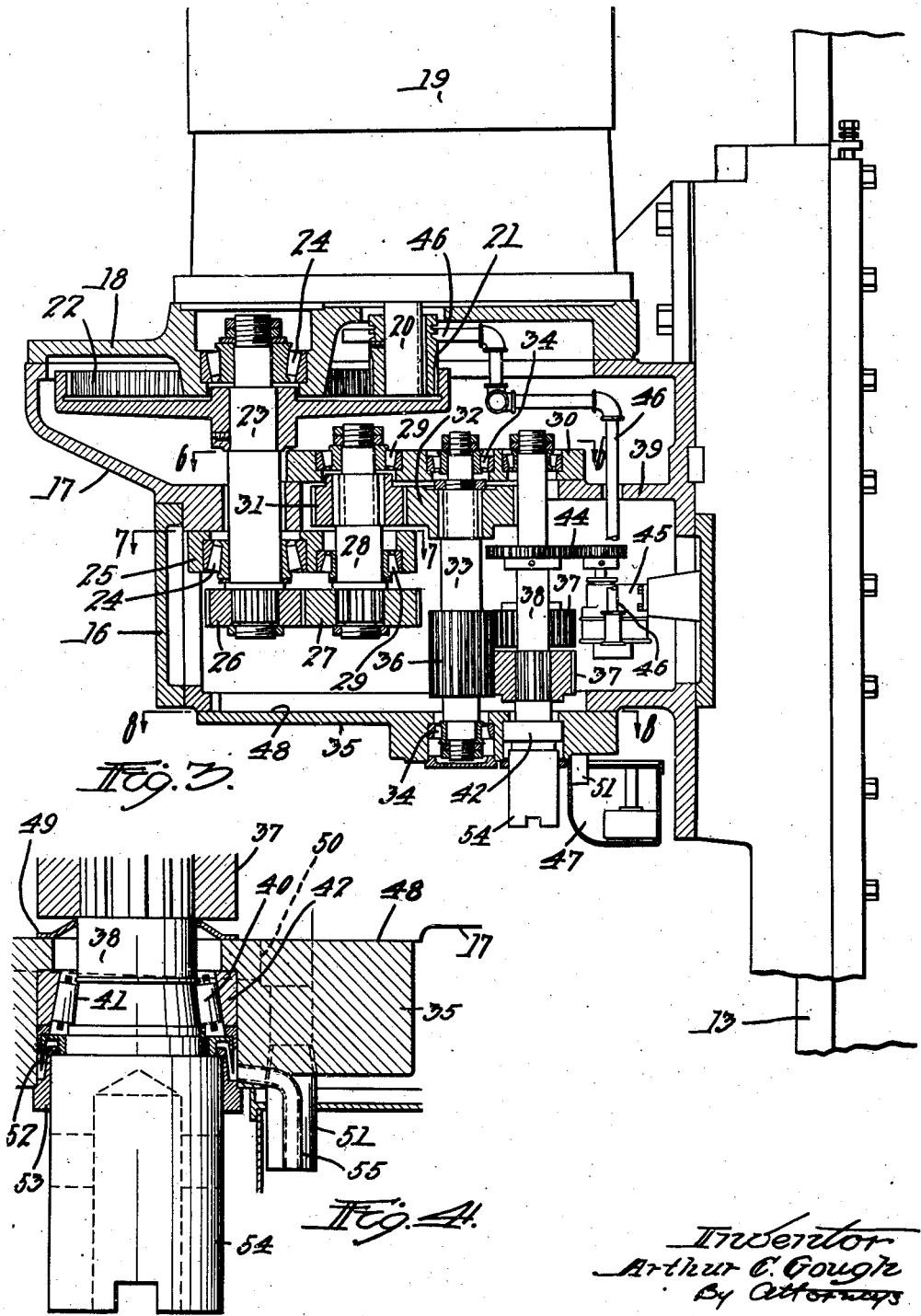

May 10, 1932.    A. C. GOUGH    1,857,953
MULTIPLE SPINDLE BORING MACHINE
Filed June 27, 1928    4 Sheets-Sheet 3

Inventor
Arthur C. Gough
By Attorneys
Southgate Fay & Hanley

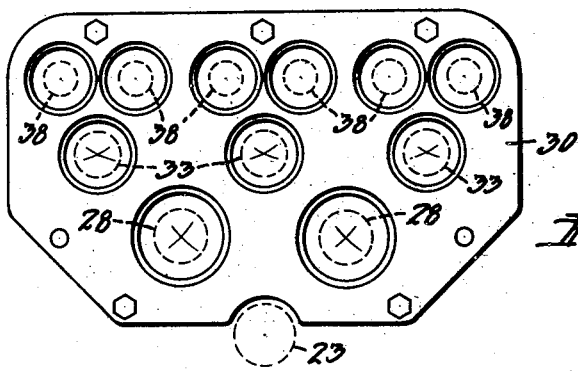
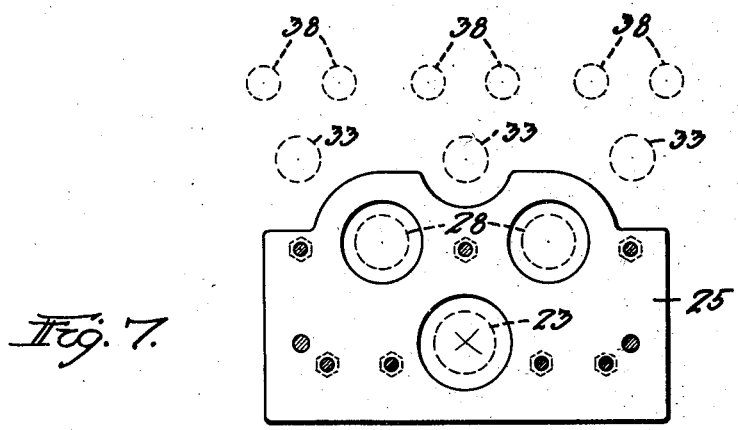
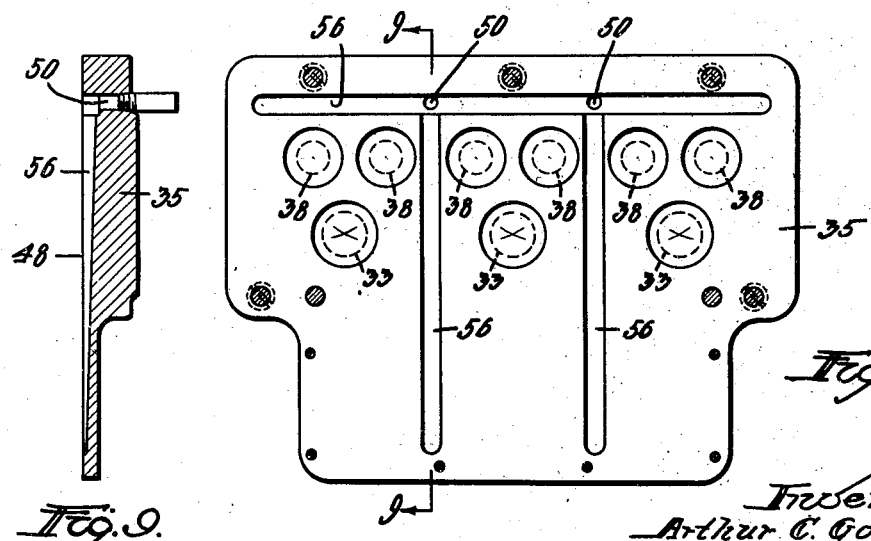

Patented May 10, 1932

1,857,953

UNITED STATES PATENT OFFICE

ARTHUR C. GOUGH, OF FITCHBURG, MASSACHUSETTS, ASSIGNOR TO SHAW CRANE-PUTNAM MACHINE COMPANY, INC., OF FITCHBURG, MASSACHUSETTS, A CORPORATION OF DELAWARE

MULTIPLE SPINDLE BORING MACHINE

Application filed June 27, 1928. Serial No. 288,760.

This invention relates to a special machine for boring cylinders or automobile engines but, of course, is also capable of being carried out without much change for the boring of other articles and also for tapping and other similar operations.

The principal object of the invention is to provide an arrangement whereby the machine can be changed very simply and with a minimum cost both as to materials and time for boring cylinders in which the centers are at different distances apart.

Other objects of the invention are to provide a frame or casing for such a machine or head adapted to be carried on the boring machine standard and fitted with removable plates for supporting the bearings for the boring spindles, which plates can be removed and replaced by others and operated by the same means and in the same way without other changes; to provide, in connection therewith, a novel arrangement of roller bearing in which the taper rollers run directly on the spindle so as to eliminate the inner race and thus enable me to use this type of bearing with comparatively large spindles, in the small space necessarily provided in the boring of automobile cylinders and the like; to provide means for lubrication involving baffles surrounding the spindles so as to prevent the main part of the oil from passing down the spindles and divert it back into the oil tank and also to provide baffles for likewise collecting the small amount of lubricant that passes down the spindles in a similar way and to provide a construction in which the motor is mounted directly on the spindle head thus reducing the driving parts from the motor to the cutting tool and the lost power to a minimum.

Other objects and advantages of the invention will appear hereinafter.

Reference is to be had to the accompanying drawings in which

Fig. 1 is a front view of a boring machine with boring mechanism thereon, constructed in accordance with this invention, particularly adapted for boring automobile cylinders;

Fig. 2 is a side view of the same;

Fig. 3 is a diametrical sectional view with the upper part taken on the line 3—3 of Fig. 5 and the lower part on the line 3ª—3ª;

Fig. 4 is a diametrical sectional view through one of the bearings for one of the tool spindles showing the method of taking care of the lubricant;

Figure 5:
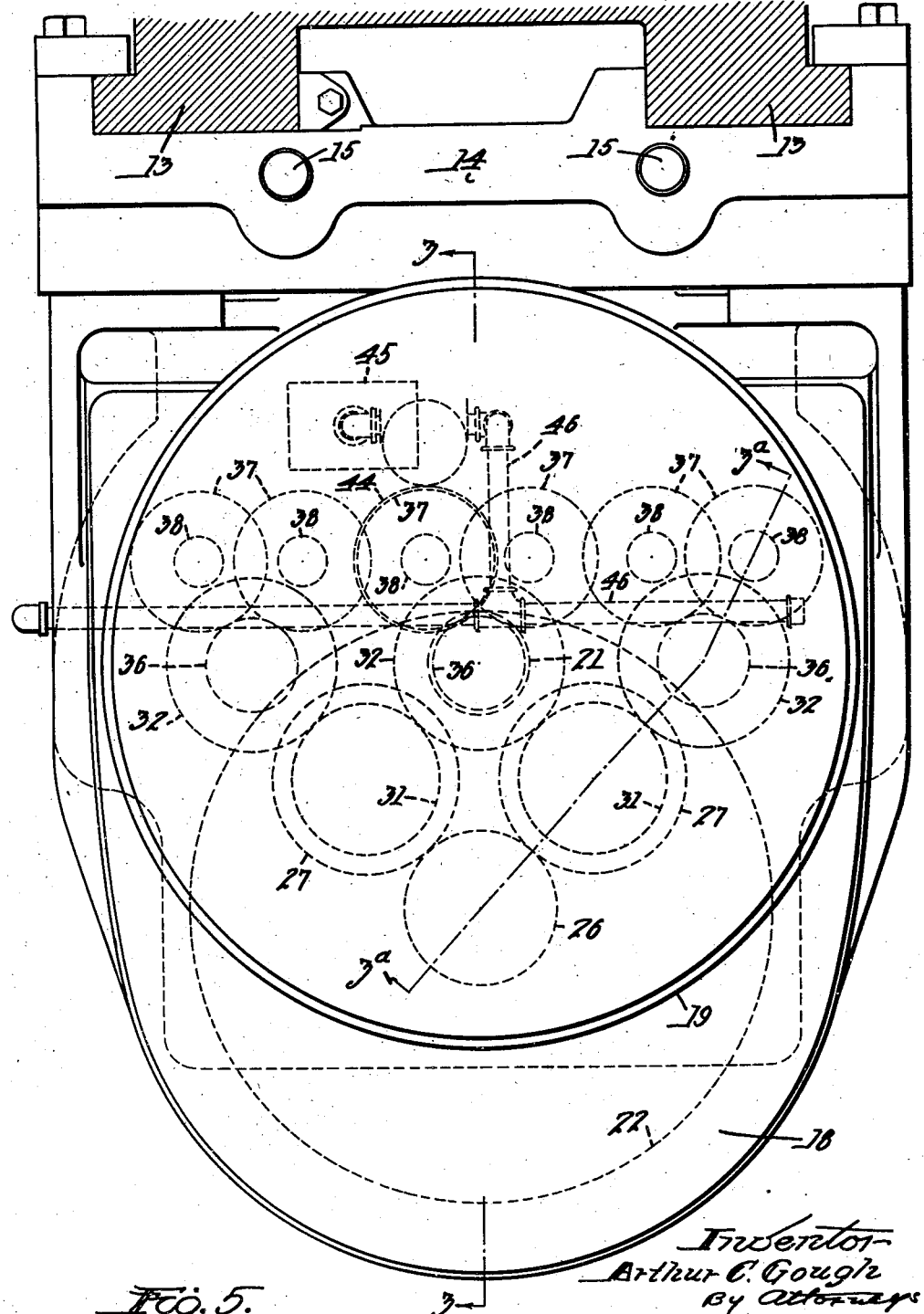
Fig. 5 is a plan of the gear box.

Figs. 6, 7 and 8 are plans of the three removable plates and associated parts on the lines 6—6, 7—7 and 8—8 of Fig. 3, and Fig. 9 is a sectional view on the line 9—9 of Fig. 8.

Although capable of other uses this invention is designed especially for use in the boring of automobile engine cylinders and is shown as applicable to a six-cylinder engine. It is customary in plants manufacturing these heads to make each one throughout for a particular spacing of cylinders which it is designed to bore and when it has to be made for a different spacing it has to be built throughout with the centers changed for that purpose. When a machine or head of this kind has to be used for boring engine cylinders in which the spacings of the cylinders are slightly different from those on which it has been used before, the whole head has to be discarded.

This invention is designed to enable a manufacturer to make the casing and the support for the motor and its reducing gearing of a standard pattern and to provide means whereby the boring spindles can be placed in it very readily, spaced different distances apart to permit of the use of the parts above mentiond in many makes of engines and yet permit of the changing of the spacing with a minimum of expense and work. Moreover, whenever from time to time spacings of the bores of the cylinder block are changed by any manufacturer, the machine which has been used can be changed over readily and not only the permanent parts above mentioned used but the spindles also. This is an advantage to the manufacturer of boring machines who can design and make new supports for the spindles when he finds the customer has changed the design of the engine slightly, but it is also of benefit to the automobile manufacturer because he can simply give the new spacings to the machine tool manufacturer and only a few parts have to be interchanged with those previously in the machine.

The machine is shown as comprising an ordinary type of upright standard 10 mounted on a base 11 and having a platform 12 for supporting the engine block to be bored. The standard is provided with vertical ways 13 on which operates a slide 14. No method of raising and lowering it has been shown as any ordinary method can be used, but screw holes 15 are illustrated for the feed screws.

On this slide is fixed in the usual way a casing 17 which is fixed to move with the slide and this is provided with an opening in the front provided with a cover plate 16. On the casing is a top cover 18 which also is a permanent part of the structure and a motor casing 19 is mounted directly and centrally on this cover 18 for the purpose of reducing the driven parts from the motor to the cutting tools to a minimum and reducing the lost power.

The motor shaft 20 is provided with a pinion 21 meshing with an internal gear 22 on a driving shaft 23. This driving shaft is mounted on roller bearings 24, preferably of the Timken type. One of these bearings is carried by the cover 18 and the one at the other end by a removable plate 25 secured in a definite position to the lower side of an integral horizontal web 39 in the casing.

The driving shaft is provided with a gear 26. From here on the gearing is substantially the same as that usually employed. This gear 26 meshes with two gears 27, one on each side and on two intermediate shafts 28. These shafts are supported in Timken bearings 29, one supported by the plate 25 and the other supported by another removable plate 30 fixed in a definite place on the top of the web 39. On these shafts 28 are another pair of gears 31 which drive three gears 32 on shafts 33, which also are intermediate shafts. These shafts are supported by Timken bearings 34, one at one end of the shaft in the plate 30 and the other at the other end of the shaft on a removable bottom plate 35. The three shafts 33 are provided with gears 36 which mesh with and drive six gears 37 on the six tool spindles 38. On account of the close spacing of these spindles the two gears 37, driven by each one of the gears 36, have to be spaced one above the other and the gear 36 has to have a double length face.

It will be seen that a slight re-spacing of the shafts 38 would throw all the gearing out and if the three plates 25, 30 and 35 were stationary or integrally mounted in the casing 16, the whole device would have to be discarded when a change of this kind is made. But, according to this invention, nothing has to be discarded but these three plates which are taken out and replaced by three other plates with substantially the same design but having different spaces not only for the shafts 38 but also for the shafts 33 and the plate 25 for the shaft 28. In many cases the plate 25 will not have to be replaced. This is a very important feature, particularly on account of the roller bearings for which these plates have to be bored.

It will be seen that as these plates are set in place and bolted to the stationary parts of the casing 17 in the same bolt holes and as one of these plates is a bottom plate allowing for access below the cross web 39 which is integral with the casing 17 and as the cover 18 is also removable to expose the plate 30, it is a comparatively simple matter to take the whole device to pieces without changing the motor drive and in fact, without taking the gears off of the shafts 28, 33 and 38, although shafts themselves may be removed and put back again. The web 39 has spaces through it large enough for the replacing of the shafts at new distances apart.

These shafts therefore are set up in the same way for any different design that may be required and assembled very easily with these removable plates and the permanent casing 17.

In order to space the boring spindles so near together and provide Timken bearings for them a special mounting has been devised. This is shown more especially in Fig. 4 in which the bearing rollers 40 run directly on a conical seat 41 machined directly on the spindle, in this case the tool spindle 38. This does away entirely with the inner race and saves the space taken up thereby. In this case an outer race 42 is employed and the principal advantage is that it permits of obtaining a large diameter spindle spaced on close center distances.

The lubrication of such a machine is a matter of great importance. For this purpose one of the spindles 38 is provided with a gear 44 which drives an oil pump 45. This supplies oil through pipes 46 to the bearings above, taking it from the tank 47 with which the intake of the pump is connected. The oil is sprayed in any of the usual ways around the inside of the head but then it runs down and settles on a surface 48. A pressed metal baffle plate 49 is provided around each spindle 38 to prevent all but a mere mist of oil from passing down around the spindle. The surface 48 is provided with an opening 50 therein through which this oil is drained down through a pipe 51 into the oil tank 47. A series of grooves 56 in the surface 48 are adapted to collect the oil deposited on this surface and direct it into the perforations 50.

The small amount of oil which passes the baffle plate 49 drains down through the Timken bearing to lubricate it and in between two baffle plates 52 and 53. The baffles 52 and 53 are in the form of collars surrounding the shaft 38 and the boring tool head 54. The baffle 52 has an internally conical downwardly extending skirt with a sharp edge and the baffle 53 has an upward projection which is conical outside, leaving a space between these conical surfaces for receiving the oil and drains it into a pipe 55 which drains it into an oil tank 47.

It will be seen therefore that the changes above referred to can be made in a very simple manner in the factory in which these machines are built and that the outside casing 17 and the cover 18 can be designed for quite a wide range of spindle distances and when an order comes in for a machine giving new spindle distances, the proper plates 25, 30 and 35 can be provided or designed readily and inserted in place with the proper shafts with comparative ease.

Also after the machine has been in use in the shop of the automobile manufacturer, any ordinary change desired in the cylinder distances can be made and the proper directions sent to the manufacturer of the machine who can ship new plates and they can be inserted in a minimum of time. The improvement in the roller bearing is also an important feature and the method of taking care of the lubricant and returning it to the tank as well.

Although I have illustrated and described only one form of the invention I am aware of the fact that modifications can be made therein by any person skilled in the art without departing from the scope of the invention as expressed in the claim. Therefore, I do not wish to be limited in this respect but what I do claim is:—

In a multiple boring machine, the combination with a permanent casing having a bearing, a main shaft having one end mounted in said bearing, a series of shafts, gearing mounted on said shafts, a series of bearing spindles adapted to be driven by said gearing, and a set of removable plates carrying the bearings for said shafts and spindles and adapted to be detached and replaced for the purpose of spacing the bearing spindles differently, of an oil pump connected with one of said spindles to be operated thereby, an oil tank for supplying the oil thereto, a baffle plate surrounding each of said spindles and preventing passage of the main part of the lubricant down along the spindle, a surface in one of said removable plates on which the oil from the baffle plates is collected, and means for draining the oil from said surface into the tank.

In testimony whereof I have hereunto affixed my signature.

ARTHUR C. GOUGH.